UNITED STATES PATENT OFFICE.

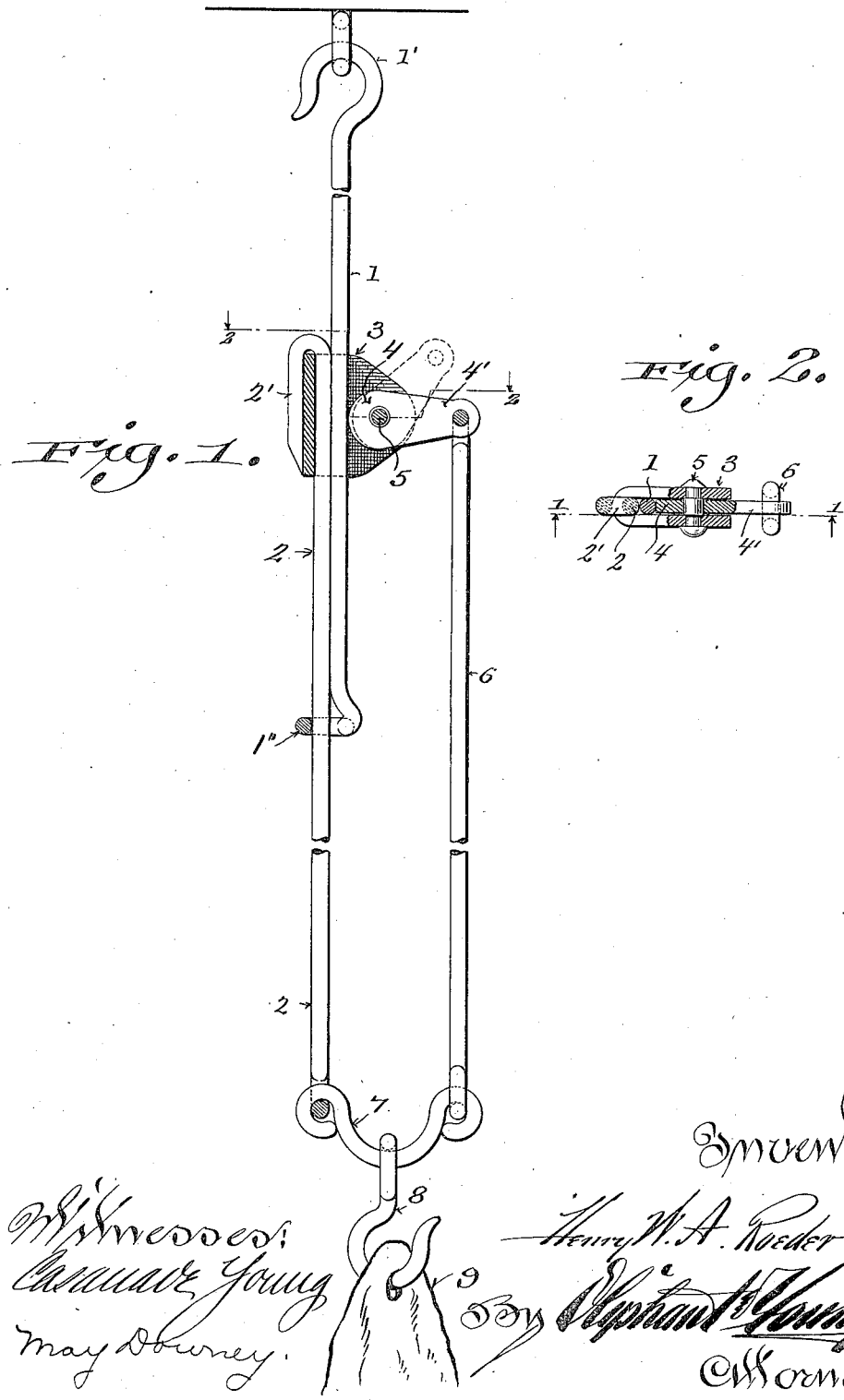

HENRY W. A. ROEDER, OF OSHKOSH, WISCONSIN, ASSIGNOR OF ONE-FOURTH TO ALBERT J. ROEDER AND ONE-FOURTH TO CHARLES E. ROEDER, BOTH OF OSHKOSH, WISCONSIN.

ADJUSTABLE HANGER.

1,092,815.  Specification of Letters Patent.  Patented Apr. 7, 1914.

Application filed November 1, 1913. Serial No. 798,669.

*To all whom it may concern:*

Be it known that I, HENRY W. A. ROEDER, a citizen of the United States, and resident of Oshkosh, in the county of Winnebago and State of Wisconsin, have invented certain new and useful Improvements in Adjustable Hangers; and I do hereby declare that the following is a full, clear, and exact description thereof.

My invention has for its object to provide a simple, economical and effective adjustable hanger, the same being particularly adapted for suspending various weighty articles, it being understood, however, that the hanger can be utilized for other purposes that may develop in its application.

With the above object in view the invention consists in certain peculiarities of construction and combination of parts as hereinafter set forth with reference to the accompanying drawings and subsequently claimed.

In the drawings Figure 1 represents a side elevation, partly in section, of a hanger embodying the features of my invention, and Fig. 2, a detailed cross-section of the same, the section being indicated by line 2—2 of Fig. 1.

Referring by characters to the drawings, 1 represents the suspension section and 2 the load section of a telescopic rod. The upper end of the suspension section terminates with a hook 1' or other means for attaching the device overhead and the lower end of said section terminates with an eye 1" through which the load section of the rod extends and is guided, it being understood that said rod sections are in slidable contact with each other. The upper end of that part of the rod constituting the load section is bent upon itself to form a loop 2', which loop engages and is secured to the throat portion of a head 3. The head is formed from a single blank bent upon itself having extended ears that incase the suspension section 1 of the rod. The ears have also fitted therebetween an eccentric 4, which eccentric is pivotally mounted upon a stud 5 that is supported by the ears of the head. The eccentric is also provided with a projecting arm 4', the outer end of which is connected to one end of a controlling rod 6, the same being extended from the eccentric arm in approximate parallel relations to the sectional rod previously described. Hence it will be seen that the load section 2 and the controlling rod 6 are connected to the head by the clutch mechanism comprising the head and eccentric, whereby the said parallel members may be raised or lowered relative to the suspension rod section 1. The lower ends of the load-section of the telescopic rod and controlling rod 6 are formed with eyes for engagement with the eyed ends of a load-sustaining link 7, which link also carries a grab-hook 8 for convenience in attaching any form of load, as indicated at 9, the grab-hook being capable of compensating play about the curved face of the link.

It is apparent from the foregoing description that the load strain upon the link 7 will be divided between the sectional rod and controlling rod and the downward draw upon said controlling rod will cause the eccentric to impinge against the suspension rod section 1, whereby the suspension rod section and load sections will be tightly gripped together by their frictional contact, the slipping strain being resisted in proportion to the strain of the load to thus suspend said load at an elevation in proportion to the adjustment of the head upon the suspension section 1 of the telescopic rod. It is also apparent that, when it is desired to raise the load, an upward movement imparted to the rod section 2 and controlling rod 6 will cause the eccentric 4 to rock and thus immediately release the suspension rod section from its clutched engagement with the load rod section, whereby the rod members 2 and 6 can be raised or lowered with respect to the suspension section 1.

It is understood that, while I have shown and described certain specific construction with reference to the head and clutch mechanism, I may vary such details within the knowledge of skilled mechanics without departing from the spirit of my invention. It is also understood that the suspension device may be of any length or size in proportion to the load desired to be carried thereby.

I claim:

1. A hanger comprising a suspension rod section and a load rod section in slidable union, a head secured to one end of the load rod section and incasing the suspension section, an eccentric carried by the head engageable with said suspension section, a controlling rod having one end connected to the eccentric, and a load sustaining link connecting the free ends of said controlling rod and the load section of the other rod.

2. A hanger comprising a telescopic rod having a suspension section and a load section, a head secured to one end of the load section of said rod having ears overlapping the suspension section of said rod, an eccentric pivoted between the head ears provided with an arm extended therefrom, a guide for the load section of the telescopic rod extending from one end of the suspension section, a controlling rod having one end connected to the arm of the eccentric, and a link connecting the free ends of the load section of the telescopic rod and the controlling rod.

In testimony that I claim the foregoing I have hereunto set my hand at Oshkosh in the county of Winnebago and State of Wisconsin in the presence of two witnesses.

HENRY W. A. ROEDER.

Witnesses:
A. E. HEDKE,
DAVID C. PINKERTON.

---

Copies of this patent may be obtained for five cents each, by addressing the "Commissioner of Patents, Washington, D. C."